Dec. 3, 1968 R. J. LEMIESZ 3,414,190
TRIGONOMETRIC COMPUTING INSTRUMENT
Filed Feb. 17, 1967
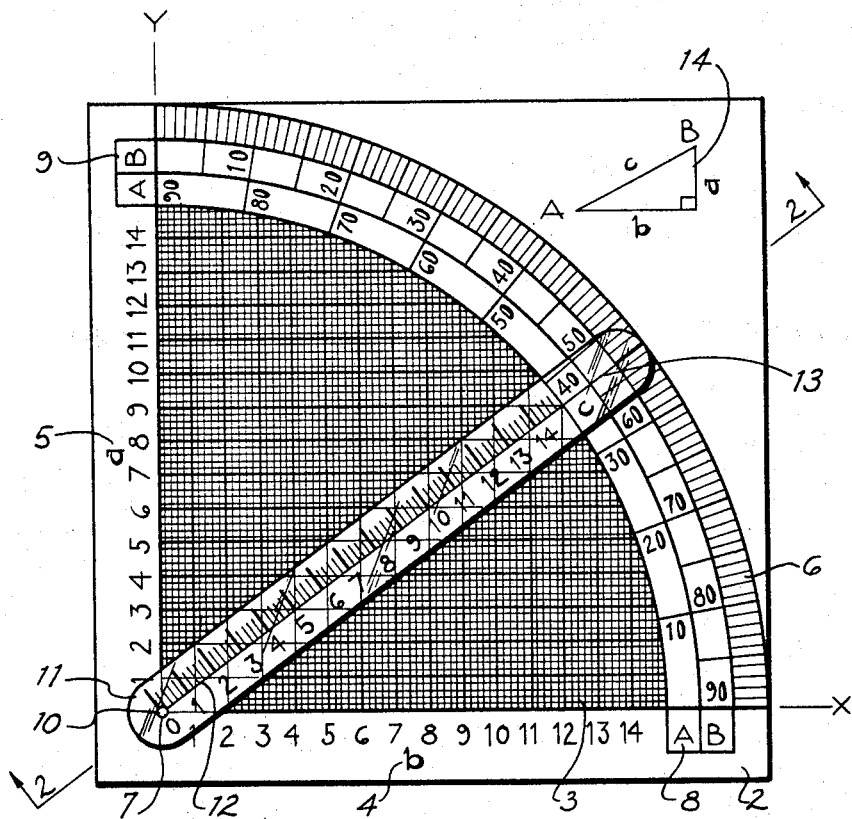
Fig_1.
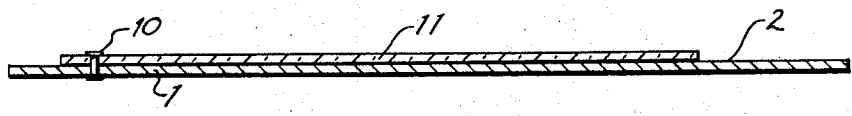
Fig_2.
INVENTOR
Richard J. Lemiesz

United States Patent Office 3,414,190
Patented Dec. 3, 1968

3,414,190
TRIGONOMETRIC COMPUTING INSTRUMENT
Richard John Lemiesz, Shelby Township, Macomb County, Mich. (14980 24 - Mile Road, Mount Clemens, Mich. 48043)
Filed Feb. 17, 1967, Ser. No. 616,957
1 Claim. (Cl. 235—61)

ABSTRACT OF THE DISCLOSURE

The invention discloses a computing gage type instrument which applies a combined graphical and algebraic method of solution to trigonometric problems. This is accomplished by providing an instrument having five variable scales of measure which are mathematically and symbolically related to the five variable parts (the three sides and two acute angles) of any right triangle which is to be solved in trigonometry.

Summary of the invention

This invention pertains to computing instruments and is directed specifically to the solution of problems encountered in trigonometry. The cardinal object of this invention is to render numerical answers to trigonometric problems expeditiously by the establishment of a variable triangle of scales from which the numerical values of unknown factors can be read directly.

The invention is based upon a graphical solution and as such, offers certain advantages. A graphical solution presents an alternative method to the algebraic approach and it may also serve as a supplemental check. Furthermore, a graphical procedure is more often clearly understood since it forms a composite picture of the problem; rather than a series of equations and numerical steps. This aspect, while being of interest to all engaged in mathematics, is of particular concern to the student in school.

Whether a problem is solved graphically or algebraically, the ease and speed with which the answer can be determined is important. In trigonometry, problems involving the right triangle lend themselves readily to a graphical solution. The angles and sides of triangles can be measured very quickly and with very little effort. However, the construction of a diagram suitable for accurate measurement is not easily executed. Proper equipment and drafting instruments, skillfully used and adequate time are required to obtain accuracy. This invention eliminates the above difficulty by providing an instrument having the necessary diagram already constructed thereon and thus reduces the graphical solution to a mere matter of measurement. This pre-established diagram, in conjunction with the various parts of the instrument herein disclosed, is capable of rapidly furnishing answers to a full range of trigonometric problems.

Since the accuracy of the results obtained graphically depends upon the precision of the diagram and upon its scale or scales, it is possible to vary the degree of accuracy of the instrument to suit its intended use. Also factors as cost, compactness, durability and the like can be regulated, during the instrument's manufacture, to meet special requirements. Therefore, the invention may assume a variety of instrument forms. To illustrate; the design and resultant forms of the invention when applied to the inside of a book cover will differ in details from another application of the invention to, say for example, a large wall type chart. Regardless of the instrument's form however, the features of the invention for which Letters Patent is sought will be indentified and explained hereafter with the aid of the accompanying drawings.

In the drawings:

FIG. 1 is an elevational front view of the invention shown in one instrument form.

FIG. 2 is a sectional view taken on line 2—2 of FIG. 1.

Referring now more particularly to said drawings:

Reference numeral 1 on FIG. 2 indicates a dial plate, which is made from suitable material to form a flat smooth dial surface 2. In considering some suitable materials, plastics, woods and metals may be mentioned. It is the dial surface which is most important, with regard to the aspects of the invention, and the dial plate being of lesser importance. In fact, while FIGS. 1 and 2 show a dial surface 2 which is an integral part of the dial plate 1, this unity is not essential. Thus many articles; the inside of a book cover, an individual sheet of cardboard, a table top, or even a wall can be used for the dial plate.

Upon dial surface 2 a portion of a rectangular coordinate system is marked. The first quadrant 3, has been shown in FIG. 1, but all, any one, or any combination of the rectangular coordinate system's quadrants could have been chosen. Quadrant 3 has been divided into fifteen units of measure which have been marked upon the principal X and Y-axis as scales $b$ and $a$ respectively. Quadrant scale $b$ has been given the identification numeral 4 and scale $a$ 5.

Between the X and Y-axis, a circular border for the quadrant is formed. This border is marked upon dial surface 2 as a circular graph 6. Graph 6 has its center of radius at the origin 7 of the quadrant. The border graph is calibrated to divide the central angle, formed by the quadrant's X and Y-axis, into angular units of measure. These angular units of measure are denoted by scales A and B. Scale A, marked 8, starts from axis X and terminates at axis Y. Scale B, marked 9, starts from axis Y and terminates at axis X.

Attached to the dial plate by means of pivot 10 is a transparent pointer 11. Pivot 10 is located at origin 7, thereby allowing the pointer to travel across the entire quadrant 3 and border graph 6. Upon the pointer is marked a linear scale $c$ which is numbered 12. Line 13, on pointer 11, originates at origin 7 and extends across scales A and B as an index for measuring the angular units upon graph 6. Also, line 13 serves as a base line for scale $c$. The units of measure for scale $c$ are identical to those used for scales $a$ and $b$. The zero marks of scales $a$, $b$ and $c$ are coincident with the quadrant's origin 7.

The operation of the instrument will be explained by referring to a lettered key triangle 14 marked upon dial surface 2. Triangle 14 is an algebraic representation of any right triangle to be encountered in trigonometry. The sides of triangle 14 are lettered $a$, $b$ and $c$ and they are respectively related to the instrument's scales $a$, $b$ and $c$. The two acute angles of triangle 14 are letter A and B and they are respectively related to the instrument's scales A and B. A relationship is thus created whereby a variable graphical right triangle of scales, formed by the instrument, is mathematically similar to the flexible algebraic key triangle 14.

Upon beginning the solution of a problem, all known numerical factors and unknown numerical factors are noted and they are assigned identification letters which correspond to the properly related lettered parts of triangle 14. This relationship is next established upon quadrant 3 and upon border graph 6. Since side $c$ of triangle 14 and movable scale $c$ of pointer 11 always represents the hypotenuse of the given triangle in the problem to be solved, pointer 11 is rotated about pivot 10 unitl scale $c$ is in a position which is consistent with the given data. This position is determined with the knowledge of any two of the five variables ($a$, $b$, $c$, A and B) of triangle 14. The numerical values of the two known factors are measured off, upon their appropriate instrument scales (*a, b, c,* A or B), by rotating the pointer until index and base line 13 indicates these values upon quadrant 3 and/or graph 6. In such a position, line 13 (scale *c*) forms a triangle with the X-axis (scale *b*) and some ordinate line of the Y-axis (scale *a*). This formed triangle is similar to triangle 14 and therefore all numerical values of the unknown factors can be read directly from the instrument's triangle of scales. A brief example problem will be given to illustrate the operation of the instrument in terms of actual numerical values.

*Example problem.*—A triangle has one side equal to 3 units and another side equal to 4 units. Determine the numerical values of its hypotenuse and of its two acute angles.

*Procedure.*—Assign the 3 unit side triangle 14 identification letter *a*, the 4 unit side identification letter *b*, the unknown hypotenuse letter *c*, the unknown angle between *c* and *b* letter, A and the other unknown angle between *c* and *a* letter B. Rotate pointer 11 until line 13 is set upon a point in quadrant 3 whose coordinates are $Y=a=3$ units and $X=b=4$ units.

Read answer thus: Hypotenuse *c* from scale $c=5$ units, angles A and B from scales A and B respectively= $36.9°$ and $53.1°$.

The setting of the pointer in FIG. 1 has been drawn to simulate the setting required by the example problem and the numerical values which can be ascertained from the figure are approximately accurate as the figure is intended for illustrative purposes only. The accuracy of the instrument is dependent upon the precision and scale of its manufactured diagram and component parts. In many fields, a degree of accuracy comparable to that of a slide rule may be considered sufficient. This degree of accuracy is readily obtainable from an instrument which is compact in size and inexpensive in construction. Accuracy above or below this level is likewise obtainable with corresponding changes in size and construction. With regard to inaccuracies due to errors of usage, it is obvious from the example problem that the operation of this instrument is simple and that, with a little practice, practically any operator can secure the degree of accuracy for which a specific instrument construction is intended.

In addition to determining the numerical values of the sides and angles of any right triangle, the numerical values of all six trigonometric functions of any angle can be determined by the instrument. The first quadrant will provide such values for all acute angles directly and all other angles indirectly. When it is desirable to have an instrument which will indicate directly the values of trigonometric functions for obtuse and other angles; the remaining second, third and fourth quadrants, together with the first quadrant, can be jointly employed.

The reversibility of parts, that is to have a transparent movable dial surface over a fixed pointer scale *c*, is hereby acknowledged. In this instance of transparency of the dial surface, as well as the previously described transparency of pointer 11, it is deemed a preferred feature of instrument construction. Other arrangements of the dial surface and the pointer can be employed whereby transparency is not required. However, preference is given to the use of transparent materials due to the consequent increased range of visibility.

I claim:
1. The combination of a trigonometric computing instrument having five scales of measure which are mathematically and symbolically related to the five variable parts of an algebraic right key triangle, said instrument consisting of a pointer, a dial plate and a rectangular coordinate system marked upon one side thereof, said side forming the instrument's dial surface, and said key triangle being marked upon said instrument, said rectangular coordinate system being provided with two linear coordinate scales marked upon its principal X and Y-axis, said coordinate scales being provided with side indicating symbols corresponding to the scale indicating symbols applied to the two sides adjacent to the right angle of said key triangle, said rectangular coordinate system being provided with a circular border graph, said graph having a center of radius at the origin of said rectangular coordinate system, and said graph having its central angle graduated and marked upon said dial surface as two angular scales, said angular scales being provided with angle indicating symbols corresponding to the scale indicating symbols applied to the two algebraic acute angles of said key triangle, said rectangular coordinate system having at its origin a pivot for the attachment of the said pointer to said dial plate, and said pivot providing the means for angular movement between the said pointer and said dial plate, said pointer being provided with a linear pointer scale calibrated with units of measure which are congruent with those of said linear coordinate scales, said pointer scale being provided with the hypotenuse indicating symbol corresponding to the scale indicating symbol applied to the hypotenuse of said key triangle, all said linear coordinate scales and said linear pointer scale having their zero marks coincident with each other and with the rectangular coordinate system's origin, said pointer and the base line of the linear pointer scale extending as an index across the rectangular coordinate system to the said angular scales of the circular border graph, said base line forming the hypotenuse of a variable graphical right triangle, said variable graphical right triangle having its two remanent sides formed by a principal axis and the coordinate lines of said rectangular coordinate system, the right angle of said variable graphical right triangle being formed by the perpendicular intersections of a principal axis and the said coordinate lines, and the two remanent graphical acute angles being formed by the intersections of said base line with a principal axis and the said coordinate lines, the vertex of one of said graphical acute angles being at the origin of said rectangular coordinate system and the vertex of the other graphical acute angle being at a point within said rectangular coordinate system, said variable graphical right triangle being mathematically similar to said algebraic right key triangle, and said graphical triangle having its three variable sides and its two variable angles provided with individual scales corresponding to the scale indicating symbols applied to the five similar variable parts of the said algebraic right key triangle, the simultaneous registry of the quantities of the two said graphical acute angles in angular units of measure as the values of the two said algebraic acute angles by the position of said base line within the aforesaid circular border graph, and the simultaneous registry of the quantities of the hypotenuse and two remanent sides of said variable graphical right triangle in linear units of measure as the values of the hypotenuse and two remanent sides of said algebraic right key triangle by the position of said base line within the aforesaid rectangular coordinate system.

References Cited

UNITED STATES PATENTS

| | | | |
|---|---|---|---|
| 1,003,857 | 9/1911 | Adams | 33—70 |
| 1,730,852 | 10/1929 | Jenny | 235—61 |
| 2,249,728 | 7/1941 | Cross | 33—70 |
| 2,892,586 | 6/1959 | Graham | 235—61 |
| 3,014,646 | 12/1961 | Gabriel | 235—61 |
| 3,088,210 | 5/1963 | Cunningham et al. | 235—61 |

STEPHEN J. TOMSKY, *Primary Examiner.*

S. A. WAL, *Assistant Examiner.*